United States Patent Office 3,356,659
Patented Dec. 5, 1967

3,356,659
TERPOLYMERS AND PROCESS OF
PREPARING SAME
Hugh J. Hagemeyer, Jr., Alden E. Blood, and Marvin B.
Edwards, Longview, Tex., assignors to Eastman Kodak
Company, Rochester, N.Y., a corporation of New Jersey
No Drawing. Filed May 19, 1964, Ser. No. 368,735
12 Claims. (Cl. 260—80.7)

This invention relates to resinous terpolymers exhibiting improved physical properties and a process for preparing the same. More particularly, this invention relates to resinous terpolymers formed from acrylonitrile, 1,3-butadiene and 2,2-dimethylalkyl methacrylates and a process for preparing the same. In a specific aspect, this invention relates to resinous terpolymers which are especially adapted to the formation of strong, non-blocking film and molding resins of high impact strength.

It is known that ethylenically unsaturated monomers can be polymerized to form polymers having valuable physical properties. Rigid and tough plastic materials have resulted from the polymerization of such monomers. However, certain physical properties such as stiffness, impact strength, heat distortion temperature, film forming properties, and the like, have not been sufficiently good for many commercial applications.

It has now been found that a monomer mixture of acrylonitrile, 1,3-butadiene and a 2,2-dimethylalkyl methacrylate, in specified proportions, upon polymerization, forms a terpolymer that exhibits an excellent combination of physical properties, including, for example, good tensile strength, and superior impact strength at low temperatures in comparison to related prior art products. In addition, certain of these terpolymers are especially valuable in that they will form films from a latex, which films have high wet film strength and dry to form strong, oil resistant, water resistant, non-blocking films. The terpolymers of this invention, therefore, represent a unique class of polymers having expanded utility, particularly in molding and casting operations where they give high strength products such as pipe, rods and the like.

It is an object of this invention, therefore, to provide the above described new class of resinous terpolymers and shaped articles produced therefrom. Another object is to provide a process for preparing such materials. Other objects will become apparent from the description and claims that follow.

In accordance with the invention, it has been found that resinous terpolymers can be prepared by polymerizing aqueous monomer mixtures of (1) about 25 to about 40%, by weight, preferably about 25 to about 35%, by weight, of 1,3-butadiene, (2) about 30 to about 45%, by weight, preferably about 30 to about 40%, by weight, of acrylonitrile and (3) about 30 to about 40%, by weight, preferably about 30 to about 35%, by weight, of a 2,2-dimethylalkyl methacrylate having the formula:

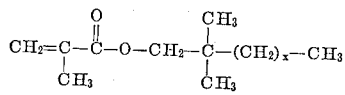

where $x$ is an integer of from 1 to 11. The percent, by weight, of the total polymerizable monomer for any given mixture is, of course, equal to 100%. The 2,2-dimethylalkyl methacrylates employed in the practice of this invention are exemplified by 2,2-dimethylbutyl methacrylate, 2,2-dimethylpentyl methacrylate, 2,2-dimethylhexyl methacrylate, 2,2-dimethylheptyl methacrylate, 2,2-dimethyldecyl methacrylate, 2,2-dimethyldodecyl methacrylate, 2,2-dimethyltetradecyl methacrylate and the like.

It is known that some resinous polymers possess non-blocking characteristics but it is generally very difficult to deposit a continuous film from aqueous dispersions of such resinous polymers. Furthermore, the elastomers which can be deposited from aqueous dispersions to form continuous films at room temperatures generally form films which are quite tacky. It was unexpected, therefore, that films prepared from aqueous dispersions of the novel terpolymers of this invention would be non-blocking, substantially free of tack and also exhibit excellent tensile strength, low elongation, high sheer strength, oil resistance and water resistance. In addition, certain combinations of monomers, as described herein, will give resinous terpolymers that can be molded into articles having high impact strength, excellent stability and high heat distortion temperatures in addition to other good physical properties.

The 2,2-dimethylalkyl methacrylates employed in the practice of this invention can be prepared by various methods, for example, by the alcoholysis process comprising a reaction betwen methyl methacrylate and a 2,2-dimethylalkyl alcohol at atmospheric pressure in the presence of tetraisopropyl titanate as catalyst. The low boiling by-product material can be removed in azeotrope form through a column of about 15 plates. The base material is flashed through a short head and distilled to recover the desired products. Alternate methods of preparation include:

(1) Esterification (methacrylic acid+2,2-dimethylalkanol)
(2) The acetone cyanohydrin process (acetone cyanohydrin)+$H_2SO_4$+2,2-dimethylalkanol)
(3) Dehydration of an appropriate alpha hydroxy ester
(4) Dehalogenation of an appropriate alpha-halo ester.

The preferred alcoholysis method is illustrated by the following procedure.

*Preparation of 2,2-dimethylbutyl methacrylate*

To a 3-liter, 3-neck flask equipped with a thermowell is added 400 g. (4 moles) of methyl methacrylate, 816 gm. (8 moles) of 2,2-dimethylbutanol, 1 gm. of hydroquinone and 6.08 gm. of tetraisopropyl titanate. The catalyst goes into solution forming a deep orange color. The mixture is refluxed under a 15-plate glass column at atmospheric pressure to recover a methanol-methyl methacrylate azeotrope. The reaction mixture is flashed on a short head to get the products away from the catalyst. Upon distillation there is recovered the desired 2,2-dimethylbutyl methacrylate (460.1 g.=83.9% of theory). The product boils at 59.5° C./5 mm. The index of refraction is 1.4286 (25° C./D.). The specific gravity (20° C./20° C.) is 0.8878 and the freezing point is −60° C. Although methyl methacrylate is the preferred intermediate in the above procedure, it will be understood that any other lower alkyl methacrylate can also be employed, for example, ethyl, propyl, isopropyl or butyl methacrylate to give similar results. The above procedure also gives the other mentioned 2,2-dimethylalkyl methacrylates of the invention by selection of the appropriate 2,2-dimethylalkyl alcohol. The 1,3-butadienes and acrylonitrile monomers employed in the practice of this invention can be prepared by any one of the many procedures found suitable for this purpose by those skilled in the art.

The polymerization reaction in which the novel terpolymers of this invention are formed is carried out in an aqueous medium using emulsion or suspension techniques. Using this type of process, aqueous mixtures of the monomers are copolymerized to form polymers whose compositions are generally of about the same proportions of monomer, in combined form, as are present in the starting polymerization mixtures. These terpolymers generally have densities in the range of about 1.05 to about 1.21, inherent viscosities in dimethylformamide at 26°

C. (0.5 gram/100 ml. of DMF) in range of about 0.5 to about 2.0, preferably about 0.9 to about 1.5, and softening points in the range of about 160 to about 200° F., preferably about 180 to about 200° F. In polymerizing the aqueous mixture of monomers by the suspension process, the mixture of monomers to be polymerized is dispersed in the liquid phase and is maintained in suspension during the polymerization reaction by agitation. Unlike emulsion polymerization, no emulsifying agent or like agent is added, but it is generally necessary to add suspension stabilizers in the form of finely divided solid particles in order to obtain the product in the desired form of beads or pearls. The temperature of polymerization employed in practicing this inventon can be varied widely, for example, temperatures in the range of about 30° to about 100° C., or more, are operable but preferred temperatures are in the range of about 35° to about 70° C. Atmospheric pressures are preferred, although the process can be carried out at pressures substantially above or below normal or atmospheric pressures. A continuous polymerization technique can be employed wherein the monomers are added continuously at a uniform rate and the terpolymer product is withdrawn as formed in the system in a continuous manner. Advantageously, activating agents such as alkali metal bisulfates or bisulfites, for example, sodium or potassium bisulfates can be used in conjunction with the catalyst in approximately equal amounts. Chain regulators such as hexyl, octyl, t-dodecyl mercaptans, or the like, can also be added during the polymerization reaction.

When the emulsion polymerization technique is employed, a small amount of a fourth monomer such as acrylic acid can be added if desired, to increase the emulsion stability so long as the added monomer does not deleteriously affect the polymerization reaction or the properties of the resulting polymer. Stirring or shaking the components of the reaction mixture facilitates the polymerization and produces more uniform products. The products can be separated by conventional methods of polymer separation from such mixtures. When emulsion polymerization is used it is, of course, possible to use the resulting latex to deposit a continuous film of high wet strength or the latex can be precipitated and the polymer dried to provide a molding resin. Suitable emulsifying agents which can be employed in the emulsion polymerization technique include for example, salts of higher fatty acids such as sodium or potassium stearate, palmitate, and the like. Ordinary soaps, salts of higher fatty alcohol sulfates, for example, sodium or potassium lauryl sulfate, sodium or potassium stearyl sulfate, salts of aromatic sulfonic acids such as alkyl naphthalene sulfonic acid and the like can also be used.

The resinous terpolymers are prepared in the presence of polymerization catalysts which insure a satisfactory polymerization rate. The catalysts employed can be varied widely and include any of those commonly employed for the polymerization of 1,3-butadiene and acrylic-type compounds, including, for example, heat, actinic light such as ultraviolet light and free radical catalysts such as peroxides and the like. Suitable catalysts are exemplified by benzoyl peroxide, acetyl peroxide, lauryl peroxide, triacetone peroxide, urea peroxide, t-butyl hydroperoxide, alkyl percarbonates, hydrogen peroxide, alkali metal persulfates, e.g., sodium or potassium persulfates, ammonium persulfate, alkali metal perborates and the like. Mixtures of catalysts can also be employed. The effective concentration of catalyst employed will vary depending on the particular reaction conditions employed but ordinarily the concentration of the catalyst is in the range of about 0.01 to about 2% or more, based on the weight of monomer feed.

This invention can be further illustrated by the following examples of preferred embodiments thereof although it will be understood that these examples are included merely for purposes of illustration and are not intended to limit the scope of the invention unless otherwise specifically indicated.

EXAMPLE 1

As already indicated, 1,3-butadiene, acrylonitrile and a 2,2-dimethylalkyl methacrylate aqueous monomer mixtures, within the proportions disclosed herein, copolymerize to form resinous terpolymers which are particularly adapted to the formation of films exhibiting excellent physical properties, including hardness, tensile strength, elongation and the like. To illustrate, a mixture of 70 g. 1,3-butadiene, 70 g. of 2,2-dimethylbutyl methacrylate, 60 g. of acrylonitrile, 8 g. of Dupanol ME (a fatty alcohol sulfate), 1 g. of t-dodecyl mercaptan, 0.2 g. sodium persulfate and 400 g. of water is heated at 50° C. for 10 hours in a stirred autoclave. The resulting latex is steam stripped and films are cast with a wet applicator and dried at 130° C.

The films have excellent wet film strength and, when dry, are tough, hard, water insensitive, non-tacky and have excellent tear strength. Certain of the physical properties of the film are set forth in the following table.

Table 1

| Property: | Value |
|---|---|
| Sward hardness, 25° C.[1] | 28 |
| Tensile strength, 2 in./min. at yield, p.s.i. | 6,200 |
| Elongation, percent | 21 |

[1] A Model C Sward Hardness Rocker (commercially available from Gardner Laboratory, Inc., Bethesda, Maryland) in the form of a horizontal pendulum weighing 100 g. responding to damping differences in resilient surfaces is employed to make the determination. The Hardness Rocker consists essentially of two four-inch metal rings spaced one inch apart. A threaded rod, extending from the top towards the center of the Rocker, carries a gravity bob for adjusting the center of gravity to regulate the oscillation frequency or period of the moving system at 1.2 seconds. A rider, mounted on the horizontal nameplate, aids in balancing the Rocker. A polished plate glass standard is used to establish a standard Rocker value of 100 under controlled damping conditions.

Similar results are obtained using the above polymerization procedure with other 2,2-dimethylalkyl acrylates, such as 2,2-dimethylhexyl methacrylate, 2,2-dimethyloctyl methacrylate, 2,2-dimethyldecyl methacrylate, 2,2-dimethyldodecyl methacrylate, or 2,2-dimethyltetradecyl methacrylate.

EXAMPLE 2

Example 1 is repeated using a monomer mixture of 70 g. of 1,3-butadiene, 60 g. of 2,2-dimethylhexyl methacrylate and 70 g. of acrylonitrile. Wet film prepared according to the procedure of Example 1 exhibits excellent strength and can be dried to form tough, hard, water insensitive non-tacky films having excellent tear strength. Certain of the properties exhibited by the dry film are set forth in the following table.

Table 2

| Property: | Value |
|---|---|
| Sward hardness, 25° C.[1] | 27 |
| Tensile strength, 2 in./min. at yield, p.s.i. | 5,900 |
| Elongation, percent | 18 |

[1] Same procedure employed as in Example 1.

EXAMPLE 3

The resinous terpolymers prepared according to the process of this invention are excellent molding resins and exhibit high impact strength. To illustrate, the polymerization procedure of Example 1 is repeated using a monomer mixture of 50 g. of 1,3-butadiene, 60 g. of 2,2-dimethylbutyl methacrylate and 90 g. of acrylonitrile. The latex obtained from the polymerization is precipitated with sodium chloride solution, washed with water and methanol and dried. A sample of this resin is molded to give a tough, hard material having the properties set forth in the following table.

Table 3

| Property: | Value |
|---|---|
| Izod Impact Strength, 25° C. (notched) ft.-lb. per in. of notch ASTM D256–54T | 13 |
| Tensile Strength 2 in./min. at yield, p.s.i. | 9,100 |
| Heat distortion temperature, ° F. | 260 |

By comparison of the above results with currently available commercial impact resins, it will be noted that the terpolymers produced in accordance with this invention are outstanding. For example, commercial resins of a similar type generally have impact strengths a 25° C. of only from 6 to 8 foot pounds. In contrast, the resinous terpolymer prepared according to Example 3 is typical of the impact resins of this invention and shows an impact strength at 25° C. of 13 foot pounds. In the same manner, the composition of Example 3 shows markedly superior tensile strength in comparison to the 2,500 to 4,000 tensile strength generally associated with the usual impact resin.

The resinous terpolymers of this invention are particularly valuable in the formation of protective coatings for a variety of applications since they form films from the latex having high wet strength and the dried film is strong, oil resistant, water resistant, and non-blocking. Such polymers can be substituted for the acrylic-type polymers now available in the prior art wherever their particular combination of superior properties is desired. These terpolpmers can also be readily milled with or without fillers, pigments, dyes, plasticizers, flow improvers and the like, and can be blended with plastic materials compatible therewith such as polystyrene, polypropylene, polyvinyl chloride, acrylonitrile polymers, butadiene polymers and the like. The resinous terpolymers can also be converted to shaped articles such as rods, pipes and the like, which exhibit outstanding stability and strength by the usual compression, injection or extrusion molding techniques.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A resinous terpolymer of a mixture of (1) about 25 to about 40%, by weight, of 1,3-butadiene, (2) about 30 to about 45%, by weight, of acrylonitrile and (3) about 30 to about 40%, by weight, of a 2,2-dimethylalkyl methacrylate having the formula:

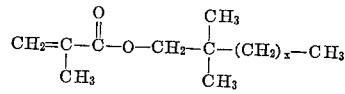

where x is an integer from 1 to 11.

2. A resinous terpolymer of a mixture of (1) about 25 to about 35%; by weight, of 1,3-butadiene, (2) about 30 to about 40%, by weight, of acrylonitrile and (3) about 30 to about 35%, by weight, of a 2,2-dimethylalkyl methacrylate having the formula:

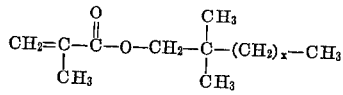

where x is an integer from 1 to 11.

3. The resinous terpolymer of claim 1 in which the 2,2-dimethylalkyl methacrylate is 2,2-dimethylbutyl methacrylate.

4. The resinous terpolymer of claim 1 in which the 2,2-dimethylalkyl methacrylate is 2,2-dimethylhexyl methacrylate.

5. A resinous terpolymer of a mixture of (1) about 35%, by weight, of 1,3-butadiene, (2) about 30%, by weight, of acrylonitrile and (3) about 35%, by weight, of 2,2-dimethylbutyl methacrylate.

6. A resinous terpolymer of (1) about 35%, by weight, of 1,3-butadiene, (2) about 35%, by weight, of acrylonitrile and (3) about 30%, by weight, of 2,2-dimethylhexyl methacrylate.

7. Film consisting essentially of the terpolymer of claim 1.

8. A process for preparing a resinous terpolymer which comprises polymerizing, at a temperature in the range of about 30° to about 100° C., an aqueous monomer mixture of (1) about 25 to about 40%, by weight, of 1,3-butadiene, (2) about 30 to about 45%, by weight, of acrylonitrile and (3) about 30 to about 40%, by weight, of a 2,2-dimethylalkyl methacrylate having the formula:

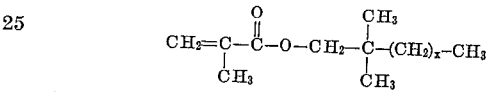

where x is an integer from 1 to 11.

9. A process for preparing a resinous terpolymer which comprises polymerizing, at a temperature in the range of about 30 to about 100° C., an aqueous monomer mixture of (1) about 25 to about 35%, by weight, of 1,3-butadiene, (2) about 30 to about 40%, by weight, of acrylonitrile and (3) about 30 to about 35%, by weight, of 2,2-dimethylalkyl methacrylate having the formula:

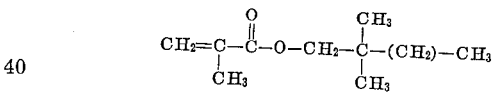

where x is an integer from 1 to 11.

10. The process of claim 8 in which the polymerization is carried out at a temperature in the range of about 30° to about 70° C.

11. The process of claim 8 in which the 2,2-dimethylalkyl methacrylate is 2,2-dimethylbutyl methacrylate.

12. A process for preparing a resinous terpolymer which comprises polymerizing, at a temperature of about 50° C., an aqueous monomer mixture of (1) about 35%, by weight, of 1,3-butadiene, (2) about 30%, by weight, of acrylonitrile and (3) about 35%, by weight, of 2,2-dimethylbutyl methacrylate.

References Cited

UNITED STATES PATENTS

| 2,384,570 | 9/1945 | Semon | 260—80.7 |
| 2,710,292 | 7/1955 | Brown | 260—80.7 |
| 2,791,571 | 5/1957 | Wheelock et al. | 260—80.7 |

JOSEPH L. SHOFER, Primary Examiner.

W. HOOVER, Assistant Examiner.